(12) United States Patent
Ramabadran

(10) Patent No.: US 7,024,353 B2
(45) Date of Patent: Apr. 4, 2006

(54) DISTRIBUTED SPEECH RECOGNITION WITH BACK-END VOICE ACTIVITY DETECTION APPARATUS AND METHOD

(75) Inventor: Tenkasi Ramabadran, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 261 days.

(21) Appl. No.: 10/215,810

(22) Filed: Aug. 9, 2002

(65) Prior Publication Data
US 2004/0030544 A1 Feb. 12, 2004

(51) Int. Cl.
*G10L 19/14* (2006.01)

(52) U.S. Cl. ............ 704/205; 704/254; 704/225; 704/214; 704/215; 704/208; 704/210; 704/233; 704/270

(58) Field of Classification Search ............ 704/205, 704/254, 225, 214, 208, 233, 270, 201, 215, 704/210
See application file for complete search history.

(56) References Cited

U.S. PATENT DOCUMENTS

| | | | | |
|---|---|---|---|---|
| 5,706,394 A * | 1/1998 | Wynn | ............ | 704/219 |
| 6,104,993 A | 8/2000 | Ashley | | |
| 6,182,032 B1 * | 1/2001 | Rapeli | ............ | 704/214 |
| 6,453,289 B1 * | 9/2002 | Ertem et al. | ............ | 704/225 |
| 6,633,839 B1 * | 10/2003 | Kushner et al. | ............ | 704/205 |
| 2003/0018475 A1 * | 1/2003 | Basu et al. | ............ | 704/270 |
| 2003/0061036 A1 * | 3/2003 | Garudadri et al. | ............ | 704/208 |
| 2003/0061042 A1 * | 3/2003 | Garudadri | ............ | 704/254 |
| 2003/0204394 A1 * | 10/2003 | Garudadri et al. | ............ | 704/201 |

OTHER PUBLICATIONS

ETSI ES 201 108 v1.1.2 Standard, "Speech Processing, Transmission and Quality Aspects (STQ); Distributed Speech Recognition; Front-end Feature Extraction Algorithm; Compression Algorithms", European Telecommunications Standards Institute, Apr. 2000, 20 pages.

* cited by examiner

Primary Examiner—David D. Knepper
Assistant Examiner—Qh Han
(74) Attorney, Agent, or Firm—Fitch, Even, Tabin & Flannery (57) ABSTRACT

In a distributed voice recognition system, a back-end pattern matching unit 27 can be informed of voice activity detection information as developed through use of a back-end voice activity detector 25. Although no specific voice activity detection information is developed or forwarded by the front-end of the system, precursor information as developed at the back-end can be used by the voice activity detector to nevertheless ascertain with relative accuracy the presence or absence of voice in a given set of corresponding voice recognition features as developed by the front-end of the system.

20 Claims, 3 Drawing Sheets

DISTRIBUTED SPEECH RECOGNITION WITH BACK-END VOICE ACTIVITY DETECTION APPARATUS AND METHOD

TECHNICAL FIELD

This invention relates generally to speech recognition and more particularly to distributed speech recognition.

BACKGROUND

Speech recognition is known in the art. In general, speech audio input is digitized and then processed to facilitate identification of specific spoken words contained in the speech input. Pursuant to one approach, so-called features are extracted from the digitized speech and then compared against previously stored patterns to enable such recognition of the speech content. It is also known to parse or distribute the feature extraction and pattern matching activities over two different processing units. For example, The European Technical Standards Institute (ETSI) has proposed, in Standard ES 201 108, Ver. 1.1.2, April 2000, a distributed speech recognition system where a portable device such as a cellular handset executes the feature extraction function and transmits the resultant features to a fixed-end platform that then facilitates the pattern matching function.

It is also known that, in general, pattern matching can be more successfully accomplished when the input can be accurately characterized as being either speech or non-speech audio input. For example, when information is available to identify a given segment of audio input as being non-speech, that information can be used to beneficially influence the functionality of the pattern matching activity by, for example, eliminating pattern matching for that particular non-speech segment. Unfortunately, the benefits of voice activity detection are not ordinarily available in distributed speech recognition systems such as the ETSI standard noted above. Instead, the speech content features are transmitted sans any voice activity detection information to the remote pattern matching platform.

BRIEF DESCRIPTION OF THE DRAWINGS

The above needs are at least partially met through provision of the distributed speech recognition with back-end voice activity detection apparatus and method described in the following detailed description, particularly when studied in conjunction with the drawings, wherein.

Skilled artisans will appreciate that elements in the figures are illustrated for simplicity and clarity and have not necessarily been drawn to scale. For example, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a plurality of speech recognition features are processed to provide at least an approximation of precursor information that originally yielded the speech recognition features. This precursor information is then processed to detect portions that likely correspond to speech and to provide a corresponding identification thereof. Such voice detection information is then used to facilitate the recognition processing of the speech recognition features.

In one embodiment, the speech recognition features include Mel frequency cepstral coefficients. In one embodiment, the speech recognition features are processed by means of an inverse discrete cosine transformation to provide resultant values that are used to provide the approximation of the precursor information. If desired, these resultant values can themselves be processed by means of exponentiation to provide the precursor information. In yet another embodiment, the speech recognition features can be processed to ascertain signal to noise information, which information is used, alone or with other voice activity detection information, to aid the recognition processing of the speech recognition features.

So configured, the pattern matching activity in a distributed speech recognition system can benefit from voice activity detection information regardless of the fact that no such voice activity detection information was initially forwarded by the features-extraction front-end. This can result in improved recognition and/or reduced power and/or processing requirements.

Figure 1:
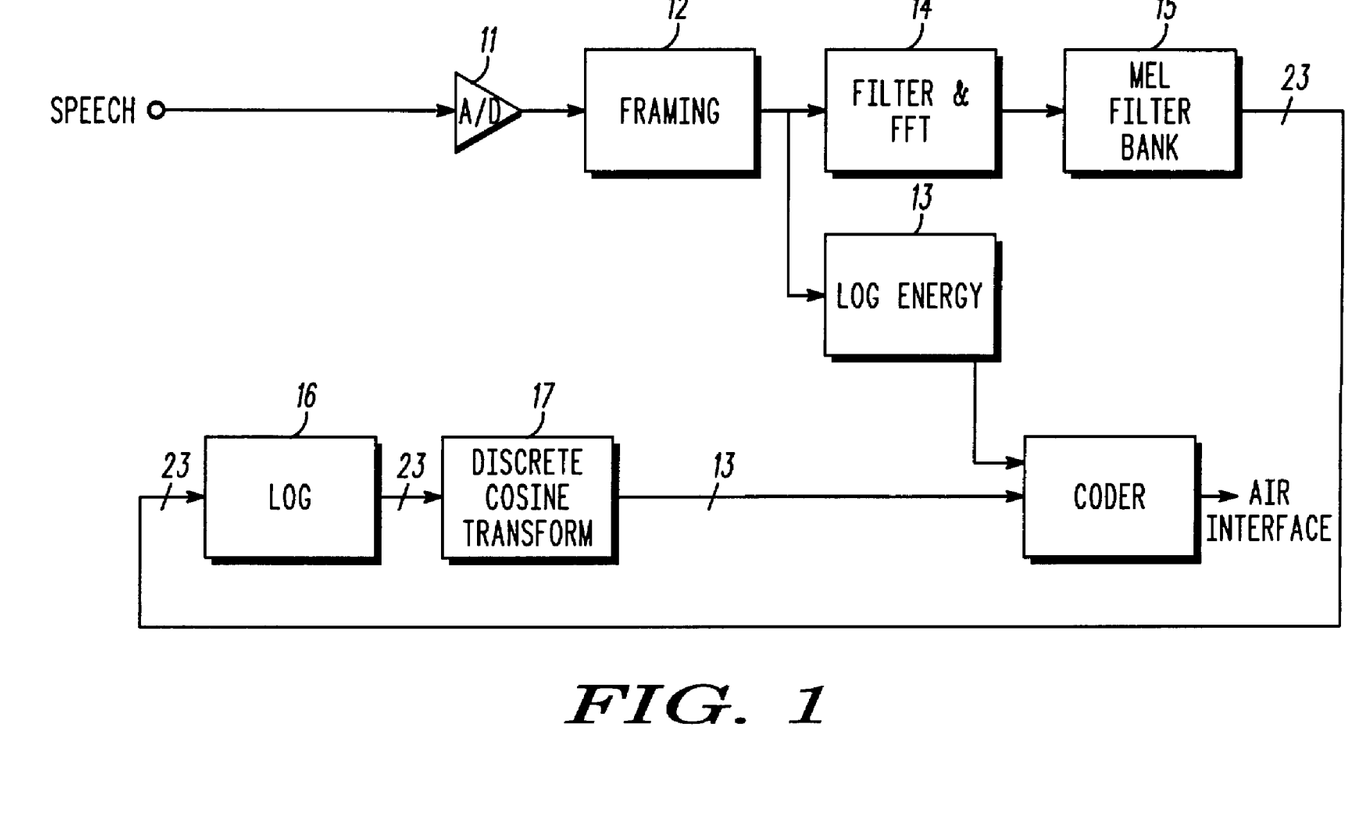
FIG. 1 comprises a prior art depiction of the front-end feature extractor of a distributed speech recognition system.

Before presenting various embodiments pertaining to the invention, it will be helpful to first present an illustrative example of front-end feature extraction for a distributed speech recognition system. This example will then provide a helpful context for presenting some specific embodiments. Referring now to FIG. 1, audio input such as speech is digitized in an analog to digital converter 11 (optionally, the digitized speech can then pass through a DC-offset removal filter (not shown) as understood in the art). A framing unit 12 then parses the digitized speech into corresponding frames. The frame-size will ordinarily be dependent on the sampling frequency. For example, the ETSI distributed speech recognition standard referenced earlier accommodates three different sampling frequencies, these being 8, 11, and 16 KHz. A suitable frame-size for these three sampling frequencies would be 200, 256, and 400 samples, respectively. At this point, a log energy unit 13 computes the natural logarithm of the overall energy for each frame to provide a Log-E parameter, which comprises one of the speech recognition features that will eventually be provided to the back-end of the distributed speech recognition system.

The framed information is provided to a filter and fast Fourier transform (FFT) unit 14. In particular, a pre-emphasis filter emphasizes the higher frequency components of the speech content. These pre-emphasized frames are then windowed by a Hamming window of the same size as the frames. The windowed frames are then transformed into the frequency domain by a fast Fourier transform. The size of the FFT depends on the sampling frequency, viz. 256 for 8 and 11 KHz and 512 for 16 KHz. The FFT magnitudes in the frequency range between 64 Hz and $F_s/2$, where $F_s$ is the sampling frequency, are then Mel-filtered 15.

Mel-filtering can be accomplished as follows. First, the frequency range above is warped into Mel-frequency scale using the expression:

$$Mel(f) = 2595.0 * \log_{10}\left(1 + \frac{f}{700.0}\right).$$

The warped frequency range is then divided into 23 equal-sized, half-overlapping bands (a.k.a. channels or bins). For example, if $F_s$=8000 Hz, the frequency range between 64 Hz and 4000 Hz is warped into the Mel-frequency range between 98.6 and 2146.1 and divided into 23 bands with each band 170.6 wide and the center of each band 85.3 apart. The center of the first band is located at 98.6+85.3=183.9, and that of the last band is located at 2146.1−85.3=2060.8. These centers are then un-warped and rounded to the nearest FFT bin frequencies. In the linear frequency domain, the 23 bands are no longer equal-sized but the size of each band generally increases as the frequency increases. The FFT magnitudes falling inside each band are then combined using a triangular weighting window (with the weight at the center equal to 1.0 and at either end approaching 0.0).

The Mel-filter bank outputs are then subjected to a (natural) logarithm function 16. The 23 log values are then transformed by a discrete cosine transform (DCT) 17 to obtain the 13 Mel frequency cepstral coefficient values $C_0$ through $C_{12}$. In this embodiment, the values $C_{13}$ through $C_{22}$ are discarded, i.e., not computed, as they are not going to be transmitted or otherwise provided to the back-end pattern matching activity.

The Mel frequency cepstral coefficient parameters and the log-E parameter are then quantized and otherwise appropriately coded in a coder 18 and provided to a wireless transmitter of choice for transmission to a remote back-end pattern matching platform The above feature extraction functionality can be readily provided in, for example, a wireless transceiver platform such as a cellular handset. So configured, it can be seen that audible speech as provided to the handset can have speech recognition features extracted therefrom for subsequent remote processing. In the example provided, the speech recognition features include Mel frequency cepstral coefficients and a log-E parameter. It should be understood that this particular example has been provided for purposes of illustration only, however, and to provide a useful basis for now providing a detailed description of some embodiments for carrying out the invention. There are numerous other speech recognition features that could be extracted, either in addition to those suggested or in lieu thereof The tenants of this invention are applicable to such alternative embodiments as well.

Figure 2:
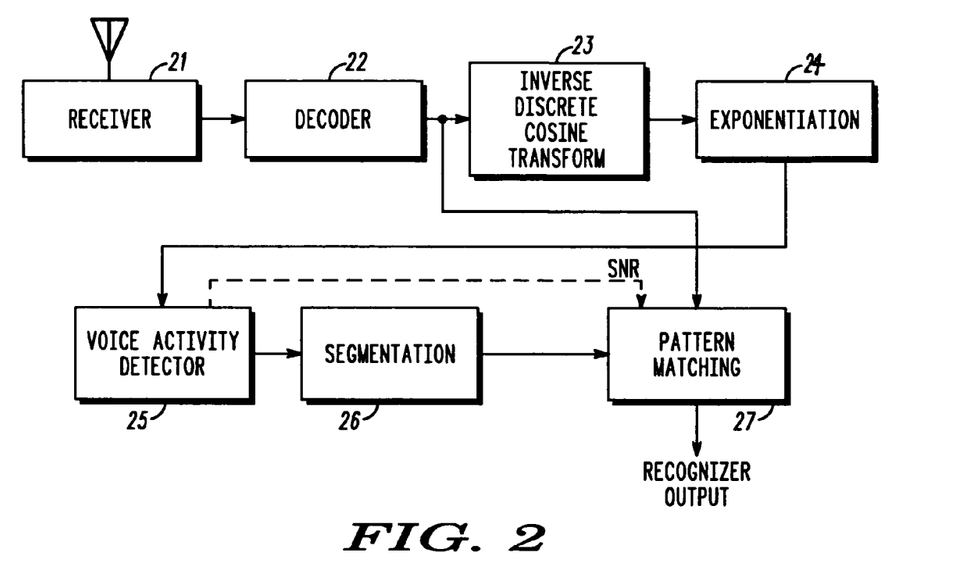
FIG. 2 comprises a block diagram depiction of a back-end pattern matching platform having voice activity detection as configured in accordance with various embodiments of the invention.

FIG. 2 provides a block diagram general overview of a back-end pattern matching platform suitable for use with the above described front-end feature extraction platform. An appropriate wireless receiver 21 receives the speech recognition feature information as transmitted by the front-end platform described above. A decoder 22 decodes the received information to specifically recover the speech recognition features described above. These features are provided to an inverse discrete cosine transform unit 23 that can be described by the following equation:

$$D_i = \frac{C_0}{23} + \frac{2}{23}\sum_{j=1}^{12} C_j \cos\left(\frac{(2i+1)j\pi}{2*23}\right); i = 0, 1, \ldots, 22.$$

(Notice that in the above equation the unavailable Cepstral Coefficients $C_{13}$ through $C_{22}$ are assumed to be zero.) The resulting $D_i$ values are then exponentiated in exponentiation unit 24 to obtain the filter bank outputs as follows:

$$F_i = \exp(D_i); i = 0, 1, \ldots, 22.$$

The filter bank outputs $F_0$ through $F_{22}$ obtained as above are, of course, only an approximation of the original filter bank outputs computed at the front-end because of the earlier truncation operation (i.e., the dropping of the values $C_{13}$ through $C_{22}$) and the quantization of the Mel frequency cepstral values $C_0$ through $C_{12}$. These filter bank outputs represent an approximation of the precursor information that was used to develop the speech recognition features from which they are now derived.

This precursor information is provided to a voice activity detector 25 that serves to detect whether the precursor information likely includes at least a significant quantity of speech or not. A segmentation unit 26 then uses this information to provide one or more signals to a pattern matching unit 27 which signals identify which segments being provided to the pattern matching unit 27 by the decoder 22 likely include speech content.

So configured, the pattern matching unit 27 can process the speech recognition feature information accordingly, thereby likely increasing recognition quality and accuracy and/or reducing power/processing needs to achieve like results.

If desired, the voice activity detector 25 can also process the recovered precursor information to develop a signal representing the signal to noise ratio (SNR) as corresponds to the original audio input. Such information is also potentially usable by the pattern matching unit 27 for similar purposes as those already mentioned above.

Figure 3:
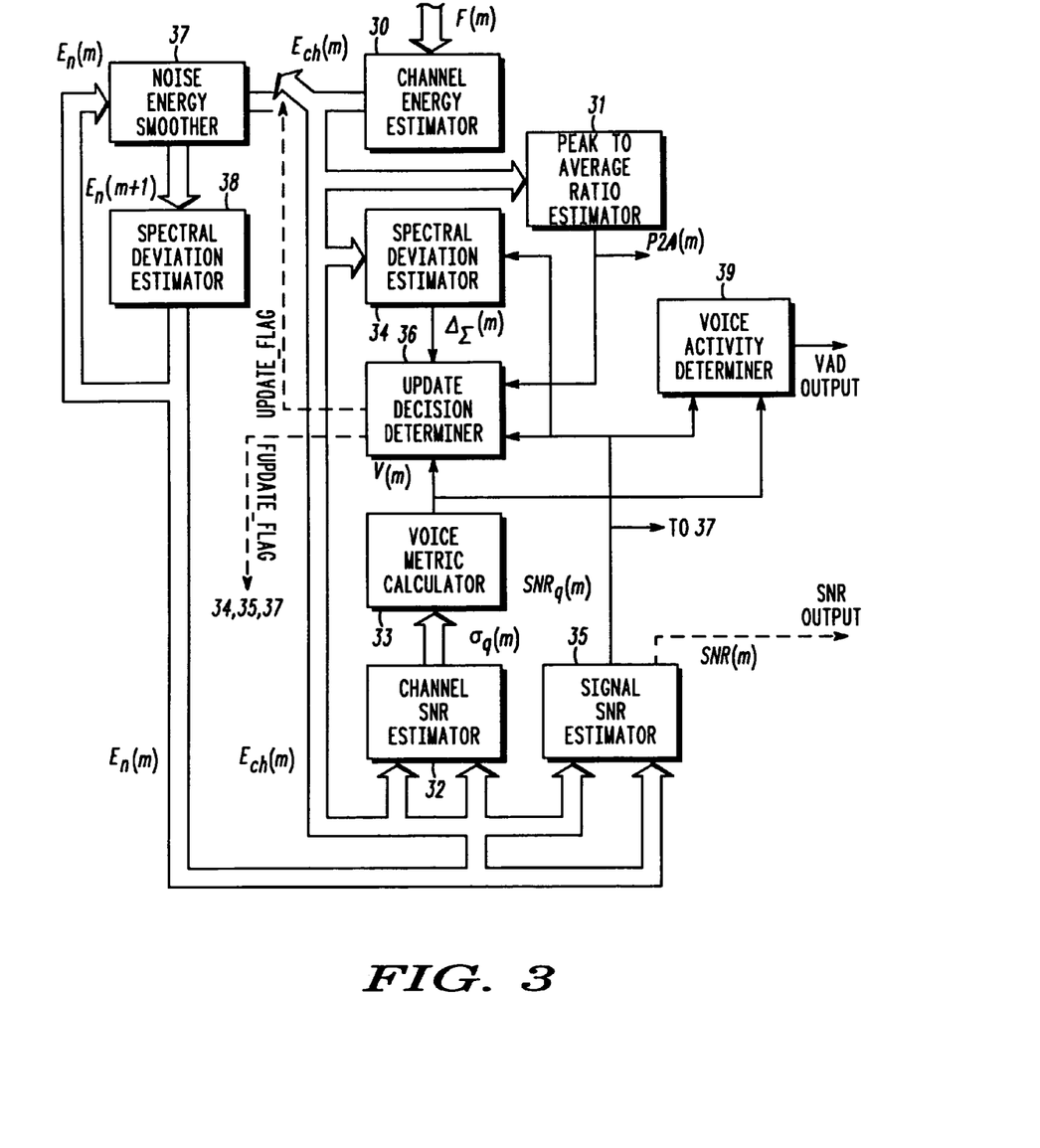
FIG. 3 comprises a block diagram of a voice activity detector as configured in accordance with an embodiment of the invention.

Referring now to FIG. 3, a more detailed description of an exemplary voice activity detector 25 will be provided. The filter bank outputs $F_0$ through $F_{22}$ mentioned above may be regarded as average spectral magnitude estimates at the different frequency bands or channels for the current input frame. We will denote the filter bank output for the $m^{th}$ frame and $i^{th}$ channel by $F(m,i)$, and when the specific channel is not important, we will denote the set of all filter bank outputs for the $m^{th}$ frame by $F(m)$. Using these values as input, a channel energy estimator 30 provides a smoothed estimate of the channel energies as follows.

$$E_{ch}(m,i) = \max\{E_{mm}, \alpha_{ch}(m)E_{ch}(m-1,i) + (1-\alpha_{ch}(m))(\lambda_1 F(m,i))^2\}; i = 0, 1, \ldots, 22$$

where $E_{ch}(m,i)$ is the smoothed channel energy estimate for the $m^{th}$ frame and the $i^{th}$ channel, $E_{min}$ is the minimum allowable channel energy, $\{\lambda_1, i=0, 1, \ldots, 22\}$ are the correction factors to compensate for the effect of the pre-emphasis filter and the varying widths of the triangular weighting windows used in Mel-filtering, and $\alpha_{ch}(m)$ is the channel energy smoothing factor defined as:

$$\alpha_{ch}(m) = \begin{cases} 0; & m \leq 1 \\ 0.45; & m > 1 \end{cases}$$

which means that $\alpha_{ch}$ assumes a value of zero for the first frame (m=1) and a value of 0.45 for all subsequent frames. This allows the channel energy estimate to be initialized to the unfiltered channel energy of the first frame. In a preferred embodiment, $E_{min}$=5000, and the value of the correction factor $\lambda_1$ (for 8 kHz sampling frequency) is given by the $i^{th}$ value in the 23-element table: {3.2811, 2.2510, 1.4051, 1.1038, 0.8867, 0.6487, 0.5482, 0.4163, 0.3234, 0.2820, 0.2505, 0.2036, 0.1680, 0.1397, 0.1179, 0.1080, 0.0931, 0.0763, 0.0674, 0.0636, 0.0546, 0.0478, 0.0046}. From the channel energy estimate, a peak to average ratio estimator 31 estimates the Peak-to-Average Ratio for the current frame m, denoted by P2A(m), as follows:

$$P2A(m) = 10\log_{10}\left(\frac{\max(E_{ch}(m,i)|_{i=4}^{22})}{(1/23)\sum_{i=0}^{22} E_{ch}(m,i)}\right).$$

Similar to the channel energy estimated, the channel noise energy estimate (defined below), in a preferred embodiment, is initialized as follows:

```
if ((m ≤ INIT_FRAMES) OR (fupdate_flag == TRUE))
{
    if (P2A(m) < PEAK_TO_AVE_THLD)
    {
                  ⎧           E_ch(m, i); m = 1, 0 ≤ i ≤ 22;
        E_n(m, i) = ⎨
                  ⎩ 0.7E_n(m − 1, i) + 0.3E_ch(m, i); 2 ≤ m ≤ INIT_FRAMES, 0 ≤ i ≤ 22;
    }
    else
    {
        E_n(m,i) = E_min; 0 ≤ i ≤ 22;
    }
}
``` where $E_n(m,i)$ is the smoothed noise energy estimate for the $m^{th}$ frame and the $i^{th}$ channel, INIT_FRAMES is the number of initial frames that are assumed to be noise-only frames, and fupdate_flag is a forced update flag defined below. In a preferred embodiment, INIT_FRAMES=10, and PEAK_TO_AVE_THLD=10.

The channel energy estimate and the channel noise energy estimate for the current frame m, and all the 23 channels are denoted by $E_{ch}(m)$ and $E_n(m)$ respectively. The channel energy estimate $E_{ch}(m)$ and the channel noise energy estimate $E_n(m)$ are used to estimate the quantized channel signal-to-noise ratio (SNR) indices at a channel SNR estimator 32 as:

$$\sigma_q(m,i) = \max\left(0, \min\left(89, \text{round}\left(10\log_{10}\left(\frac{E_{ch}(m,i)}{E_n(m,i)}\right)\middle/0.375\right)\right)\right); 0 \le i \le 22$$

where the values {$\sigma_q(m, i)$, $i=0, 1, \ldots, 22$} are constrained to be between 0 and 89 both inclusive.

From the channel SNR estimate $\sigma_q(m)$ for the current frame, the voice metric V(m) for the current frame is computed at a voice metric calculator 33 as the sum:

$$V(m) = \sum_{i=0}^{22} v(\sigma_q(i))$$

where v(k) is the $k^{th}$ value of the 90-element voice metric table v defined as:

$$v =$$

{1, 1, 1, 1, 1, 1, 2, 2, 2, 2, 2, 3, 3, 3, 3, 3, 4, 4, 4, 5, 5, 5, 6, 6, 7, 7, 7, 8, 8, 9, 9, 10, 10, 11, 12, 12, 13, 13, 14, 15, 15, 16, 17, 17, 18, 19, 20, 20, 21, 22, 23, 24, 24, 25, 26, 27, 28, 28, 29, 30, 31, 32, 33, 34, 35, 36, 37, 37, 38, 39, 40, 41, 42, 43, 44, 45, 46, 47, 48, 49, 50, 50, 50, 50, 50, 50, 50, 50, 50, 50}.

The channel energy estimate $E_{ch}(m)$ for the current frame is also used as input to a spectral deviation estimator 34, which estimates the spectral deviation $\Delta_E(m)$ for the current frame as follows. First, the log energy spectrum is estimated as:

$$E_{dB}(m,i) = 10 \log_{10}(E_{ch}(m,i)); i=0, 1, \ldots, 22.$$

Next, the spectral deviation $\Delta_E(m)$ is estimated as the sum of the absolute difference between the current log energy spectrum and an average long-term log energy spectrum denoted by $\overline{E}_{dB}(m)$, that is:

$$\Delta_E(m) = \sum_{i=0}^{22} |E_{dB}(m,i) - \overline{E}_{dB}(m,i)|.$$

The average long-term log energy spectrum is initialized as follows:

```
if ((m ≤ INIT_FRAMES) OR (fupdate_flag == TRUE))
{
    E̅_dB (m,i) = E_dB (m,i); 0 ≤ i ≤ 22;
}
```

The average long-term log energy spectrum is updated as follows:

$$\overline{E}_{dB}(m+1, i) = \begin{cases} 0.9\overline{E}_{dB}(m, i) + 0.1E_{dB}(m, i); & V(m) > \text{SIG\_THLD}(m) \\ 0.7\overline{E}_{dB}(m, i) + 0.3E_{dB}(m, i); & V(m) \leq \text{SIG\_THLD}(m) \end{cases}$$

where the parameter SIG_THLD(M) depends on the quantized signal SNR described next.

A signal SNR estimator 35 estimates the speech signal SNR as follows. First, the total noise energy of the current frame $E_{tn}(m)$ is computed as the sum of the channel noise energies, that is:

$$E_{tn}(m) = \sum_{i=0}^{22} E_n(m, i).$$

Next, the instantaneous total signal energy $E_{ts,inst}(m)$ is computed as follows:

```
if (V(m) > SIG_THLD(m))
{
    E_ts,inst(m) = Σ_{i=0}^{22} max(E_ch(m, i), E_n(m, i))
}
```

The instantaneous total signal energy $E_{ts,inst}(m)$ is updated as above only if the current frame is determined to be a signal frame by checking whether $V(m) > \text{SIG\_THLD}(m)$. It is also clear that the signal energy estimated above is really (signal+noise) energy in the strict sense. Initialization of $E_{ts,inst}(m)$ is performed as follows.

```
if ((m ≦ INIT_FRAMES) OR (fupdate_flag == TRUE))
{
    E_ts,inst(m) = INIT_SIG_ENRG;
}
``` where the value of INIT_SIG_ENRG=1.0E+09 in a preferred embodiment.

Once the total instantaneous signal energy and the total noise energy are computed, the instantaneous signal-to-noise ratio of the current frame denoted by $SNR_{inst}(m)$ is computed as:

$$SNR_{inst} = \max(0.0, 10 \log_{10}(E_{ts,inst}(m)/E_{tn}(m))).$$

From the instantaneous SNR, the smoothed SNR is estimated as:

```
if ((m ≦ INIT_FRAMES) OR (fupdate_flag == TRUE))
{
    SNR(m) = SNR_inst(m);
}
else
{
    if (V(m) > SIG_THLD(m))
    {
        SNR(m) = βSNR(m-1) + (1-β) SNR_inst(m);
        β = min(β+0.003, HI_BETA);
    }
    else
    {
        β = max(β-0.003, LO_BETA);
    }
}
```

In a preferred embodiment, the lower and upper limits of the smoothing factor β are respectively LO_BETA=0.950 and HI_BETA=0.998. Because we estimate the SNR as the ratio between (signal+noise) energy to signal energy, the lowest value of the estimated SNR is zero. The estimate is more accurate for higher values of SNR and it becomes less and less accurate as the SNR value decreases. The signal SNR is then quantized to 20 different values as:

$$SNR_q(m) = \max(0, \min(\text{round}(SNR(m)/1.5), 19)).$$

The quantized signal SNR is used to determine different threshold values. For example, the signal threshold for the next frame SIG_THLD(m+1) is determined using $SNR_q(m)$ as an index into the 20-element table {36, 43, 52, 62, 73, 86, 101, 117, 134, 153, 173, 194, 217, 242, 268, 295, 295, 295, 295, 295} in a preferred embodiment.

At this point, the voice metric V(m), the spectral deviation $\Delta_E(m)$, the peak-to-average ratio P2A(m), and the quantized signal SNR $SNR_q(m)$ are input to an update decision determiner 36. The logic shown below in pseudo-code demonstrates how the noise estimate update decision can be made. It also demonstrates how a forced update decision is made (a forced update mechanism allows the voice activity detector to recover from wrong classification of background noise as speech whenever there is a sudden increase in background noise level).

First, the update threshold for the current frame UPDATE_THLD(m) is determined using $SNR_q(m)$ as an index into a 20-element table given by {31, 32, 33, 34, 35, 36, 37, 37, 37, 37, 37, 37, 37, 37, 37, 38, 38, 38, 38, 38} in a preferred embodiment. The update decision determination process begins by clearing the update flag (update_flag) and the forced update flag (fupdate_flag). These flags are set if certain conditions are satisfied as illustrated in the pseudo-code below:

```
update_flag = FALSE;
fupdate_flag = FALSE;
if ((m > INIT_FRAMES) AND (V(m) < UPDATE_THLD(m)) AND
   (P2A(m) < PEAK_TO_AVE_THLD)
{
    update_flag = TRUE;
    update_cnt = 0;
}
else
{
    if ((P2A(m) < PEAK_TO_AVE_THLD) AND
       (Δ_E(m) < DEV_THLD))
    {
        update_cnt = update_cnt + 1;
        if (update_cnt ≧ UPDATE_CNT_THLD)
        {
            update_flag = TRUE;
            fupdate_flag = TRUE;
        }
    }
}
```

In order to avoid long term "creeping" of the update counter (update_cnt) setting the forced update flag (fupdate_flag) falsely in the above pseudo-code, hysteresis logic is implemented as shown below:

```
if (update_cnt == last_update_cnt)
{
   hyster_cnt = hyster_cnt + 1;
}
else
{
   hyster_cnt = 0;
   last_update_cnt = update_cnt;
}
if (hyster_cnt > HYSTER_CNT_THLD)
{
   update_cnt = 0;
}
```

In a preferred embodiment, the values of (previously undefined) constants used above are as follows:

DEV_THLD=70
UPDATE_CNT_THLD=500
HYSTER_CNT_THLD=9

Whenever the above referenced update flag is set for a given frame, the channel noise estimate for the next frame is updated in a noise energy smoother 37 using:

$E_n(m+1,i)=0.9E_n(m,i)+0.1E_{ch}(m,i)); i=0\ 1,\ldots, 22.$

The updated channel noise estimate is stored in noise energy estimate storage 38 for all future frames until the next update occurs. The output of the noise energy estimate storage 38 $E_n(m)$ is used as an input to the channel SNR estimator 32 as described earlier.

Now the operation of a voice activity determiner 39 will be described. The voice metric V(m) and the quantized signal SNR value $SNR_q(m)$ serve as inputs to the voice activity determiner 39. For the first INIT_FRAMES frames, the output of the voice activity determiner denoted by VAD_FLAG is set to FALSE since these frames are assumed to be noise-only frames. For the following frames, the voice activity determiner operates as follows. As a first step, the quantized SNR value is used to determine the voice metric threshold $V_{th}$, the hangover count threshold $H_{cnt}$, and the burst count threshold $B_{cnt}$ for the current frame as:

$V_{th}(m)=V_{table}[SNR_q(m)], H_{cnt}(m)=H_{table}[SNR_q(m)],$
$B_{cnt}(m)=B_{table}[SNR_q(m)],$ where $SNR_q(m)$ is used as an index into the respective tables. In a preferred embodiment, these tables are defined by:

$V_{table}=\{33, 35, 36, 37, 38, 40, 42, 44, 46, 48, 50,$
$52, 54, 56, 58, 58, 58, 58, 58, 58\},$ $H_{table}=\{54, 52, 50, 48, 46, 44, 42, 40, 38, 36, 34,$
$32, 30, 28, 26, 24, 22, 20, 18, 16\},$ and $B_{table}=\{3, 3, 3, 4, 4, 4, 4, 4, 5, 5, 5, 5, 5, 5, 6, 6, 6,$
$6, 6, 6\}.$ Then, the voice activity of the current frame is determined by testing if the voice metric exceeds the voice metric threshold. If the output of this test is TRUE, then the current frame is declared "voice-active." Otherwise, the hangover count variable (hangover_count) is tested to find out if it is greater than or equal to zero. If the output of this test is TRUE, then the current frame is also declared "voice-active." If the outputs of both tests are FALSE, then the current frame is declared "voice-inactive." The "hangover" mechanism is generally used to cover slowly decaying speech that might otherwise be classified as noise, and to bridge over small gaps or pauses in speech that may be degraded by aggressive voice activity detection. The hangover mechanism is activated if the number of consecutive "voice-active" frames (counted by the burst_count variable) is at least equal to $B_{cnt}$, the burst count threshold. To activate the mechanism, the number of hangover frames is set to $H_{cnt}$, the hangover count threshold. The pseudo-code for the voice activity determiner is shown below:

```
if (V(m) > V_th(m))
{
    VAD_LOCAL = TRUE;
    burst_count = burst_count + 1;
    if (burst_count >= B_cnt(m))
    {
        hangover_count = H_cnt(m);
    }
}
else
{
    VAD_LOCAL = FALSE:
    burst_count = 0;
    if (hangover_count >= 0)
    {
        hangover_count = hangover_count - 1;
    }
}
if ((VAD_LOCAL == TRUE) OR (hangover_count >= 0))
{
    VAD_FLAG = TRUE;
}
else
{
    VAD_FLAG = FALSE;
}
```

The variable VAD_FLAG from 310 is output as the voice activity information for each frame. Optionally, the unquantized SNR value SNR(m) from 306 is also output.

So configured, an approximation of precursor information as derived from speech recognition features that have been provided by a remote front-end for a distributed speech recognition system can be developed and used to aid in identifying portions of the speech recognition feature information that itself corresponds to speech and non-speech. This information in turn is readily used, in accordance with well understood prior art technique, to inform the activities and functionality of a back-end pattern matching process to facilitate improved recognition and/or improved logistical operation. In short, the benefits of voice activity detection are provided to the back-end of a distributed voice recognition system notwithstanding that such information was not developed in the first instance at the front-end and then provided to the back-end. Instead, information as provided by the front-end is at least partially reverse processed to at least approximate information as it originally appeared at the front-end to then facilitate the voice activity detection activity.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. In particular, it is again emphasized that the specific embodiments set forth are illustrative only; the essential concepts of the invention are applicable in a wide variety of distributed voice recognition systems and contexts and should not be viewed as being limited to only the embodiments set forth for purposes of illustration.

I claim:

1. A method for facilitating recognition of speech, comprising:
   at a back-end platform:
   receiving a plurality of speech recognition features;
   receiving a plurality of cepstral features as part of receiving the plurality of speech recognition features;
   processing at least some of the plurality of cepstral features to provide at least an approximation of precursor information that yielded the plurality of cepstral features;
   processing the at least an approximation of precursor information to detect portions that likely correspond to speech activity and provide a corresponding identification of speech portions;
   processing the plurality of speech recognition features as a function, at least in part, of the identification of speech portions to facilitate recognition of speech content represented by at least some of the speech recognition features.

2. The method of claim 1 wherein receiving a plurality of speech recognition features includes receiving, via a wireless channel, the plurality of speech recognition features.

3. The method of claim 1 wherein receiving a plurality of cepstral features includes receiving a plurality of cepstral features including at least one Mel frequency cepstral coefficient.

4. The method of claim 3 wherein receiving a plurality of cepstral features including at least one Mel frequency cepstral coefficient includes receiving a plurality of Mel frequency cepstral coefficients.

5. The method of claim 4 wherein receiving a plurality of Mel frequency cepstral coefficients includes receiving at least 13 Mel frequency cepstral coefficients.

6. The method of claim 1 wherein processing at least some of the plurality of cepstral features to provide at least an approximation of precursor information that yielded the plurality of cepstral features includes processing at least some of the plurality of cepstral features by means of an inverse discrete cosine transformation to provide a plurality of resultant values.

7. The method of claim 6 wherein processing at least some of the plurality of cepstral features by means of an inverse discrete cosine transformation further includes processing at least one of the resultant values by means of exponentiation.

8. The method of claim 1 and further comprising processing the at least an approximation of precursor information to determine signal to noise ratio values that likely correspond to the speech that yielded the plurality of speech recognition features.

9. The method of claim 8 wherein processing the plurality of speech recognition features as a function, at least in part, of the identification of speech portions to facilitate recognition of speech content represented by at least some of the speech recognition features further includes processing the plurality of speech recognition features as a function, at least in part, of the identification of speech portions and the signal to noise ratio values to facilitate recognition of speech content represented by at least some of the speech recognition features.

10. An apparatus for use in facilitating distributed speech recognition, the apparatus comprising:
    at a back-end platform:
    a voice activity detector having an input operably coupled to receive cepstral features as derived from at least an approximation of precursor information and having at least a first output that provides a speech activity detection signal identifying the at least an approximation of the precursor information that likely corresponds to speech;
    a segmentation unit having an input operably coupled to the first output of the voice activity detector and having an output that provides a speech detection signal identifying portions of the at least an approximation of the precursor information that likely correspond to speech; and
    a pattern matching unit having inputs operably coupled to receive the cepstral features and the speech detection signal and having an output that provides recognized speech as corresponds to the cepstral features.

11. The apparatus of claim 10 wherein the voice activity detector further includes a second output that provides a signal to noise ratio signal that corresponds to the speech that yielded the plurality of cepstral features.

12. The apparatus of claim 11 wherein the pattern matching unit further has an input operably coupled to receive the signal to noise ratio signal.

13. The apparatus of claim 10 wherein the cepstral features include a plurality of Mel frequency cepstral coefficients.

14. The apparatus of claim 13 wherein the voice activity detector includes inverse discrete cosine transformation means for facilitating use of the plurality of Mel frequency cepstral coefficients to provide the at least an approximation of the precursor information.

15. The apparatus of claim 14 wherein the voice activity detector further includes exponentiation means for further facilitating use of the Mel frequency cepstral coefficients to provide the at least an approximation of the precursor information.

16. The apparatus of claim 10 and further comprising a decoder having an input operably coupled to receive a coded bit stream and an output that provides the cepstral features.

17. The apparatus of claim 16 and further comprising a wireless receiver that is operably coupled to the decoder.

18. A method comprising:
    at a back-end platform:
    receiving over a wireless channel a signal including a bit stream containing information derived from a plurality of input samples;
    decoding the bit stream to recover thirteen Mel frequency cepstral coefficients and a logarithmic value of energy as corresponds to each frame of input samples;
    using an inverse discrete cosine transformation and exponentiation to convert the Mel frequency cepstral coefficients into a spectral representation thereof;
    using the spectral representation to detect portions thereof that likely include speech activity;
    using the Mel frequency cepstral coefficients, the logarithmic value for each frame of the input samples, and information identifying portions that likely include speech to facilitate a pattern matching process to recognize speech content in the input.

19. The method of claim 18 and further comprising using the spectral representation of the input to determine signal to noise ratio values.

20. The method of claim 19 wherein using the Mel frequency cepstral coefficients, the logarithmic value for each frame of the input samples, and information identifying portions of the input that likely include speech to facilitate a pattern matching process to recognize speech content in the input includes using the Mel frequency cepstral coefficients, the logarithmic value for each frame of the input samples, the information identifying portions of the input that likely include speech, and the signal to noise ratio values to facilitate a pattern matching process to recognize speech content in the input.

* * * * *